US008300987B2

(12) United States Patent
Wei

(10) Patent No.: US 8,300,987 B2
(45) Date of Patent: Oct. 30, 2012

(54) APPARATUS AND METHOD FOR GENERATING A DETAIL-ENHANCED UPSCALED IMAGE

(75) Inventor: Jeff X. Wei, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 1053 days.

(21) Appl. No.: 11/863,904

(22) Filed: Sep. 28, 2007

(65) Prior Publication Data

US 2009/0087120 A1 Apr. 2, 2009

(51) Int. Cl.
*G06K 9/36* (2006.01)
*G06K 9/44* (2006.01)
*G06K 9/46* (2006.01)

(52) U.S. Cl. ........ 382/300; 382/263; 382/265; 382/266; 382/270; 382/272; 382/299; 386/50

(58) Field of Classification Search .................. 382/300, 382/263, 265, 266, 270, 272, 299; 386/50
See application file for complete search history.

(56) References Cited

U.S. PATENT DOCUMENTS

| 4,472,732 | A | 9/1984 | Bennett et al. |
| 4,631,750 | A | 12/1986 | Gabriel et al. |
| 4,669,100 | A | 5/1987 | Slotboom et al. |
| 4,680,628 | A | 7/1987 | Wojcik et al. |
| 4,740,842 | A | 4/1988 | Annegarn et al. |
| 4,750,057 | A | 6/1988 | Baumeister |
| 4,800,436 | A | 1/1989 | Polaert et al. |
| 4,868,655 | A | 9/1989 | Choquet et al. |
| 4,881,125 | A | 11/1989 | Krause |
| 4,908,874 | A | 3/1990 | Gabriel |
| 4,941,045 | A | 7/1990 | Birch |
| 4,947,251 | A | 8/1990 | Hentschel |
| 4,982,280 | A | 1/1991 | Lyon et al. |
| 4,989,090 | A | 1/1991 | Campbell et al. |
| 4,992,982 | A | 2/1991 | Steenhof |

(Continued)

FOREIGN PATENT DOCUMENTS

EP 0690617 A2 1/1996

(Continued)

OTHER PUBLICATIONS

Le Gall; Compression Standard for Multimedia Applications; Association for Computing Machinery; vol. 34, No. 4; pp. 47-58, Apr. 1991.

(Continued)

*Primary Examiner* — Michael A Newman
(74) *Attorney, Agent, or Firm* — Faegre Baker Daniels LLP

(57) ABSTRACT

An upscaler is disclosed that upscales each of a maximum value map, a minimum value map and an average value map to a destination resolution. A blending module generates a detail-enhanced upscaled image of the source image having the destination resolution by blending corresponding pixel values from an upscaled image of the source image with at least one of: the upscaled maximum value map and the upscaled minimum value map. The blending may be based on the strength of detected edges in the source image and further based on a comparison of each pixel value in the upscaled image with a corresponding pixel value in an average value map. A source image characteristic calculator may generate the maximum value map, the minimum value map and the average value map based on the intensity values of a source image.

22 Claims, 6 Drawing Sheets

U.S. PATENT DOCUMENTS

| | | | |
|---|---|---|---|
| 4,998,153 | A | 3/1991 | Kuyk et al. |
| 5,014,119 | A | 5/1991 | Faroudja |
| 5,046,164 | A | 9/1991 | Hurst, Jr. |
| 5,055,927 | A | 10/1991 | Keesen et al. |
| 5,101,403 | A | 3/1992 | Balzano |
| 5,128,791 | A | 7/1992 | LeGall et al. |
| 5,134,480 | A | 7/1992 | Wang et al. |
| 5,144,429 | A | 9/1992 | Haghiri et al. |
| 5,151,783 | A | 9/1992 | Faroudja |
| 5,159,451 | A | 10/1992 | Faroudja et al. |
| 5,191,576 | A | 3/1993 | Pommier et al. |
| 5,193,004 | A | 3/1993 | Wang et al. |
| 5,233,421 | A | 8/1993 | Chrisopher |
| 5,237,414 | A | 8/1993 | Faroudja |
| 5,289,305 | A | 2/1994 | Lake, Jr. |
| 5,305,104 | A | 4/1994 | Jensen et al. |
| 5,327,240 | A | 7/1994 | Golston et al. |
| 5,351,083 | A | 9/1994 | Tsukagoshi |
| 5,408,270 | A | 4/1995 | Lim |
| 5,428,398 | A | 6/1995 | Faroudja |
| 5,436,663 | A | 7/1995 | Guede |
| 5,467,138 | A | 11/1995 | Gove |
| 5,488,419 | A | 1/1996 | Hui et al. |
| 5,488,421 | A | 1/1996 | Hwang et al. |
| 5,508,746 | A | 4/1996 | Lim |
| 5,517,247 | A | 5/1996 | Correa et al. |
| 5,521,644 | A | 5/1996 | Sezan et al. |
| 5,532,750 | A | 7/1996 | De Haan et al. |
| 5,596,371 | A | 1/1997 | Pakhchyan et al. |
| 5,600,731 | A | 2/1997 | Sezan et al. |
| 5,602,654 | A | 2/1997 | Patti et al. |
| 5,619,272 | A | 4/1997 | Salmon et al. |
| 5,621,470 | A | 4/1997 | Sid-Ahmed |
| 5,621,481 | A | 4/1997 | Yasuda et al. |
| 5,627,555 | A | 5/1997 | den Hollander |
| 5,661,525 | A | 8/1997 | Kovacevic et al. |
| 5,682,205 | A | 10/1997 | Sezan et al. |
| 5,689,305 | A | 11/1997 | Ng et al. |
| 5,724,098 | A | 3/1998 | Murakami et al. |
| 5,754,248 | A | 5/1998 | Faroudja |
| 5,774,593 | A | 6/1998 | Zick et al. |
| 5,784,115 | A | 7/1998 | Bozdagi |
| 5,793,435 | A | 8/1998 | Ward et al. |
| 5,844,614 | A | 12/1998 | Chong et al. |
| 5,864,369 | A | 1/1999 | Swan |
| 5,917,963 | A * | 6/1999 | Miyake ......................... 382/300 |
| 5,929,913 | A | 7/1999 | Etoh |
| 5,936,670 | A | 8/1999 | Frencken |
| 5,943,099 | A | 8/1999 | Kim |
| 5,995,154 | A | 11/1999 | Heimburger |
| 6,037,986 | A | 3/2000 | Zhang et al. |
| 6,118,486 | A | 9/2000 | Reitmeier |
| 6,118,488 | A | 9/2000 | Huang |
| 6,121,978 | A | 9/2000 | Miler |
| 6,141,056 | A | 10/2000 | Westerman |
| 6,188,437 | B1 | 2/2001 | Webb et al. |
| 6,208,350 | B1 | 3/2001 | Herrera |
| 6,239,842 | B1 | 5/2001 | Segman |
| 6,266,092 | B1 | 7/2001 | Wang et al. |
| 6,330,032 | B1 | 12/2001 | Boehlke |
| 6,340,990 | B1 | 1/2002 | Wilson |
| 6,370,198 | B1 | 4/2002 | Washino |
| 6,373,992 | B1 * | 4/2002 | Nagao ......................... 382/266 |
| 6,392,706 | B1 | 5/2002 | Sugiyama |
| 6,414,719 | B1 | 7/2002 | Parikh |
| 6,437,828 | B1 | 8/2002 | Chambers et al. |
| 6,456,329 | B1 | 9/2002 | Tinker et al. |
| 6,459,454 | B1 | 10/2002 | Walters |
| 6,459,455 | B1 | 10/2002 | Jiang et al. |
| 6,473,460 | B1 | 10/2002 | Topper |
| 6,487,304 | B1 | 11/2002 | Szeliski |
| 6,549,240 | B1 | 4/2003 | Reitmeier |
| 6,570,624 | B2 | 5/2003 | Cornog et al. |
| 6,690,427 | B2 | 2/2004 | Swan |
| 6,970,206 | B1 | 11/2005 | Swan et al. |
| 7,218,355 | B2 | 5/2007 | Zhou et al. |
| 7,406,208 | B2 * | 7/2008 | Chiang ......................... 382/266 |
| 7,679,620 | B2 * | 3/2010 | Hoppe et al. .................. 345/606 |
| 7,751,642 | B1 * | 7/2010 | Persson ......................... 382/266 |
| 7,782,401 | B1 * | 8/2010 | Chou ......................... 348/581 |
| 2001/0048771 | A1 * | 12/2001 | Sasaki ......................... 382/260 |
| 2002/0054236 | A1 | 5/2002 | Wredenhagen et al. |
| 2002/0075412 | A1 | 6/2002 | Tang et al. |
| 2002/0101535 | A1 | 8/2002 | Swan |
| 2003/0156301 | A1 | 8/2003 | Kempf et al. |
| 2005/0025377 | A1 * | 2/2005 | Avinash et al. ............... 382/260 |
| 2005/0078214 | A1 | 4/2005 | Wong et al. |
| 2005/0105830 | A1 * | 5/2005 | Chung et al. .................. 382/300 |
| 2008/0266580 | A1 * | 10/2008 | Choi et al. .................... 358/1.2 |
| 2008/0291332 | A1 * | 11/2008 | Messing et al. ............... 348/625 |

FOREIGN PATENT DOCUMENTS

| | | |
|---|---|---|
| EP | 0739129 A2 | 10/1996 |
| EP | 1207693 A2 | 5/2002 |
| EP | 1515543 A2 | 3/2005 |
| EP | 1596595 A1 | 11/2005 |
| JP | 10-322626 | 12/1998 |

OTHER PUBLICATIONS

ISO/IEC DIS 13818-2 Draft International Standard Information Technology—Generic coding of moving pictures and associated audio information—Part 2 Video, May 10, 1994, pp. 1-1.

A. Murat Tekalp, "Digital Video Processing," Chapter 16—Standards Conversion, pp. 302-330—1995.

European Search Report dated Mar. 28, 2006 for EP Application No. EP04255496, pp. 1-3.

Weinand, Lars, TV-Tuner and Videoschnitt: Ati All-In-Wonder RADEON 8500DV; from Tom's Hardware Guide (online); Dec. 11, 2001, pp. 1-2.

Weinand, Lars, Neue Mainstream-Klasse; Radeon 9000 (RV250), from Tom's Hardware Guide (online), Jul. 18, 2002, pp. 1-6.

ATI Technologies, White Paper Radeon Digital Video, from www.ati.com, Jun. 14, 2000, pp. 1-20.

Yoshida, Junko, Phillips new chip said to remove LCD TV artifacts*; EE Times, Jul. 8, 2003, pp. 1-2, www.eetimes.com/sys/OEG20030708S0017.

Bock, A.M., Motion-adaptive standards conversion between formats of similar field rates, Signal Processing Image Communication, Jul. 31, 1993, pp. 275-280.

Woods, John, W., et al., Hierarchical Motion Compensated De-interlacing; SPIE, Nov. 11, 1991, pp. 805-810.

De Haan, Gerard et al., Deinterlacing—An Overview; IEEE, Sep. 1998, vol. 86, No. 9, pp. 1839-1857.

European Search Report for EP Application No. EP05252564, Aug. 29, 2005.

Martinez, Dennis M. et al.; Spatial Interpolation of Interlaced Television Pictures; IEEE; 1989; pp. 1886-1889.

Bakker, P. et al.; Edge preserving orientation adaptive filtering; IEEE; 1999; pp. 535-540.

Tai, S.C. et al.; A Motion and Edge Adaptive Deinterlacing Algorithm; IEEE Int'l Conf. on Multimedia and Expo; 2004; pp. 659-662.

U.S. Appl. No. 11/467,978, entitled Method and Apparatus for Interpolating Image Information, filed Aug. 29, 2006.

Zhao, M. et al.; Intra-field de-interlacing with advanced up-scaling methods; IEEE 2004; pp. 315-319.

Li, Xin et al.; New Edge-Directed Interpolation; IEEE; vol. 10, No. 10, Oct. 2001; pp. 1521-1527.

Jensen, Kris et al.; Subpixel Edge Localization and the Interpolation of Still Images; IEEE; vol. 4, No. 3; Mar. 1995; pp. 285-295.

Hilman, Kevin et al.; Using Motion-Compensated Frame-Rate Conversion for the Correction of 3:2 Pulldown Artifacts in Video Sequences; IEEE; vol. 10, No. 6, Sep. 2000; pp. 869-877.

* cited by examiner

APPARATUS AND METHOD FOR GENERATING A DETAIL-ENHANCED UPSCALED IMAGE

FIELD OF THE INVENTION

The present disclosure generally relates to image enhancement techniques, and more particularly, to image enhancement techniques such that details are generated while upscaling a source image.

BACKGROUND OF THE INVENTION

It is known to implement edge enhancement techniques in computing devices (e.g., any thing that computes including but not limited to personal computer systems, both mobile and stationary including PDAs, mobile phones and other devices, notebook computers, desktop computers, etc.), digital cameras, televisions, digital media players (e.g., DVD players) and printers to make pictures, graphics, images, and video (individually and collectively, "images") to look artificially sharper and more crisp than they otherwise appear. As is recognized many edge enhancement techniques create bright and dark highlights along either side of a line in an image to give the appearance of contrast from a distance and thus fool the human eye into thinking that the picture is more detailed. In many cases, where adverse halo effects are created as a result of implementing edge enhancement techniques, edge-enhanced images are actually less detailed as the halo effects often cover up finer details originally present in the source image.

Upscaling of images is also known in the prior art and is used to improve the resolution of an image, e.g., by increasing the number of horizontal lines within the frame so that when the images are drawn on a monitor, more pixel values are displayed. As with edge enhancement techniques, upscaling or interpolation techniques may also be performed by a variety of devices including but not limited to computing devices (e.g., any thing that computes including but not limited to personal computer systems, both mobile and stationary including PDAs, mobile phones and other devices, notebook computers, desktop computers, etc.), digital cameras, televisions, digital media players (e.g., DVD players) and printers. For example, on a television capable of supporting HDTV, an image may be upscaled from 480 lines to 1080 lines. Any suitable enlargement factor may be used, as recognized in the prior art. A variety of upscaling techniques are known in the prior art. Their associated benefits and disadvantages are also well documented as certain techniques may be better suited for different environments. For example, non-linear interpolation schemes are generally known to be "expensive" to realize in hardware implementations. Some of the known upscaling schemes include, for example, bilinear filtering interpolation schemes, bicubic filtering interpolation schemes, edge-directed interpolation schemes, nearest pixel interpolation schemes and other non-linear interpolation schemes. One example of an edge-directed interpolation scheme is described in the U.S. patent application having application Ser. No. 11/467,978, entitled "METHOD AND APPARATUS FOR INTERPOLATING IMAGE INFORMATION", having inventors Jeff Wei and Marinko Karanovic, and owned by instant Assignee, which is incorporated herein in its entirety. Other examples of edge-directed interpolation schemes include, but are not limited to NEDI ("New Edge-Directed Interpolation"). In prior art cases where it is desirable to both upscale and enhance edges in an image, the adverse effects of the edge enhancement algorithms are made more severe due to the upscaling. For instance, contours in an edge enhanced destination image appear thick and blurred and halo affects are more noticeable.

Accordingly, a suitable system and method for upscaling while sharpening the details of an image is needed. In other words, a high quality system and method for producing an enhanced upscaled image based on a source image is needed. Such a system and method should limit the appearance of thick and blurred contours and edges in the destination image while also limiting the appearance of adverse halo effects. Such a system and method should also be capable of being implemented in small hardware such as small video processing engines or by a programmable engine such as a programmable shader.

BRIEF DESCRIPTION OF THE DRAWINGS

The invention will be more readily understood in view of the following description when accompanied by the below figures and wherein like reference numerals represent like elements.

DETAILED DESCRIPTION

In one embodiment of the present disclosure a source image characteristic calculator generates a maximum value map, a minimum value map and an average value map based on the intensity values of a source image. Each pixel value in the maximum and minimum value maps represents the largest and smallest intensity value of pixels surrounding a corresponding pixel in the source image, respectively. Each pixel value in the average value map represents the average of corresponding locations in the maximum and minimum value maps. An upscaler is used to upscale each of the maximum value map, the minimum value map and the average value map to a destination resolution. A blending module is then used to generate a detail-enhanced upscaled image of the source image and having the destination resolution. In one embodiment, the blending module generates the detail-enhanced upscaled image by blending corresponding pixel values from an upscaled image of the source image with at least one of: the upscaled maximum value map and the upscaled minimum value map based on the strength of detected edges in the source image and further based on a comparison of each pixel value in the upscaled image with a corresponding pixel value in the average value map.

In one embodiment, a pixel value in one of the upscaled maximum value map and the upscaled minimum value map contributes to a corresponding pixel value in the detail-enhanced upscaled image when the pixel value difference between a corresponding pixel value in the upscaled image and a corresponding pixel value in the average value map is beyond a known threshold value. In one embodiment, the threshold values is based on a difference between corresponding values in the max and min value maps.

In the following detailed description, numerous specific details are set forth in order to provide a thorough understanding the present disclosure. It will be apparent to one of ordinary skill in the art, however, that these specific details need not be used to practice the present disclosure. In other instances, well-known structures, interfaces and processes have not been shown or described in detail in order not to unnecessarily obscure the present invention.

Figure 1:
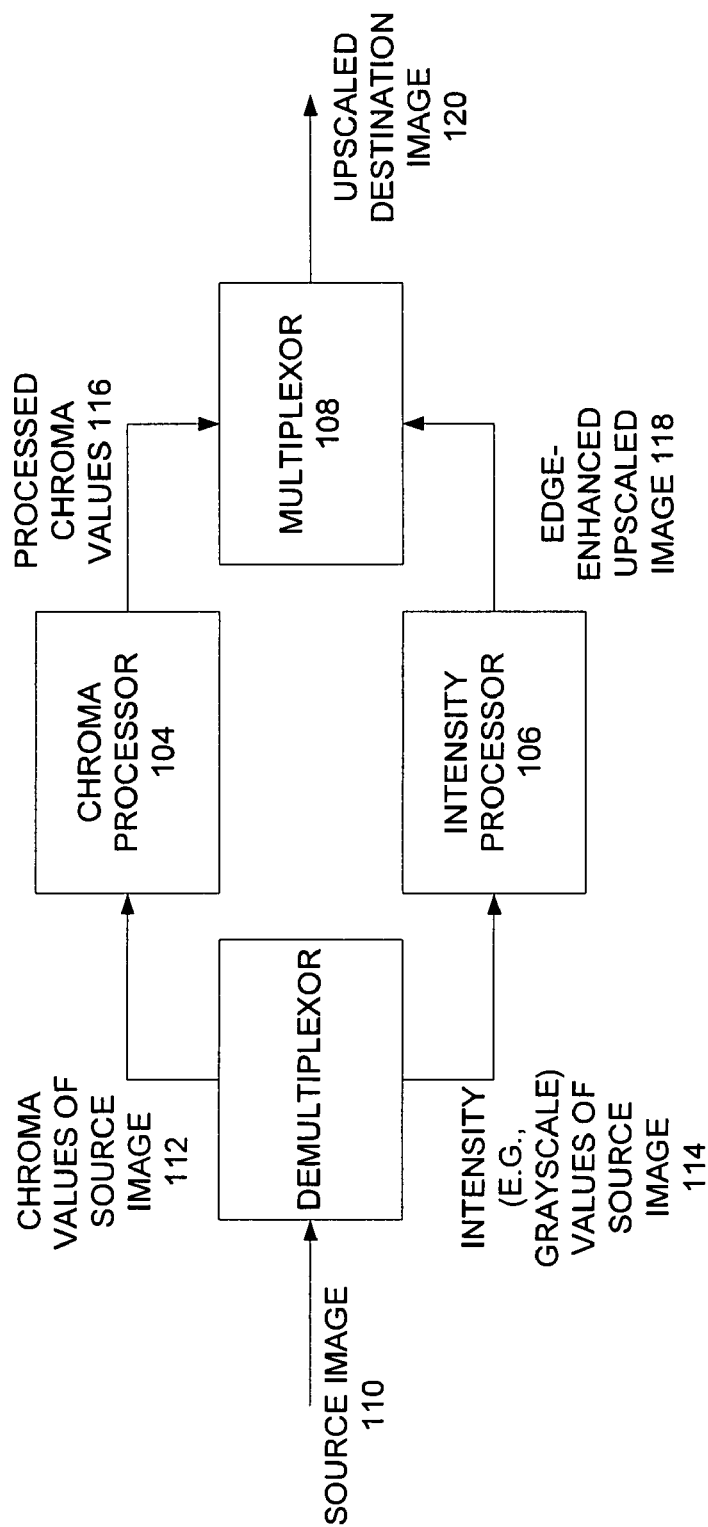
FIG. 1 illustrates a block diagram of a portion of a video processing unit in accordance with the prior art.

FIG. 1 illustrates an exemplary block diagram of a portion of a video processing unit 100 in accordance with the prior art. The portion of the video processing unit 100 includes a demultiplexor 102, a chroma processor 104, an intensity processor 106, and a multiplexor 108. It is recognized that the video processing unit 100 may be a stand alone unit on its own integrated circuit or circuits or may be a portion of a larger processing devices such as, but not limited to, a graphics processing unit having video processing capabilities. Video processing unit 100 and its components may be implemented on any number of integrated circuits or integrated circuit packages and may be, for example, an application specific integrated circuit, a digital signal processor, a SIMD machine/processor, a processing core of a larger processor, or any other suitable device or element. In one embodiment, the video processing unit 100 and its components may be implemented using one or more processors coupled to memory containing executable instructions such that when executed, the one or more processors performs the tasks as described above.

Demultiplexor 102 receives the source image 110 and separates it into its two component parts: chroma 112 (i.e., color) and intensity (i.e., grayscale or luma) 114. As is recognized, intensity is a measurement of how bright the image is. Source image 110 corresponds to any suitable baseband source of image(s) such as raw digital video, raw image, digital video decoded from a digital television broadcast, digital video decoded from streaming video over the internet, from any suitable memory, etc. and may include still images or moving images. The chroma values 112 of the source image are sent to the chroma processor 104 while the intensity values 114 are directed to the intensity processor 106. Within each processor 104 and 106, individual upscaling and/or edge enhancement may occur as is known in the art to generate processed chroma values 116 and edge-enhanced upscaled image values 118 (i.e., processed intensity values 118). Finally, the processed chroma values 116 and the edge-enhanced upscaled image values 118 are directed to a multiplexor 108 for recombination as the upscaled destination image 120.

Upscaled destination image 120 may be stored in memory, (not shown), for example a frame buffer, coupled to any suitable entity for additional processing, or coupled to a monitor (not shown) for display thereon. As is used herein, memory may include one or more volatile and non-volatile devices capable of storing information including but not limited to RAM, ROM, flash memory, etc. Further, it is recognized that demultiplexor 102 and multiplexor 108 may not be required in certain embodiments, e.g., where the source image 110 is already demultiplexed or where source image 110 does not have any chroma values. Additionally, it is recognized that certain applications may not desire recombination of the processed chroma and intensity values 116 and 118.

Figure 2:
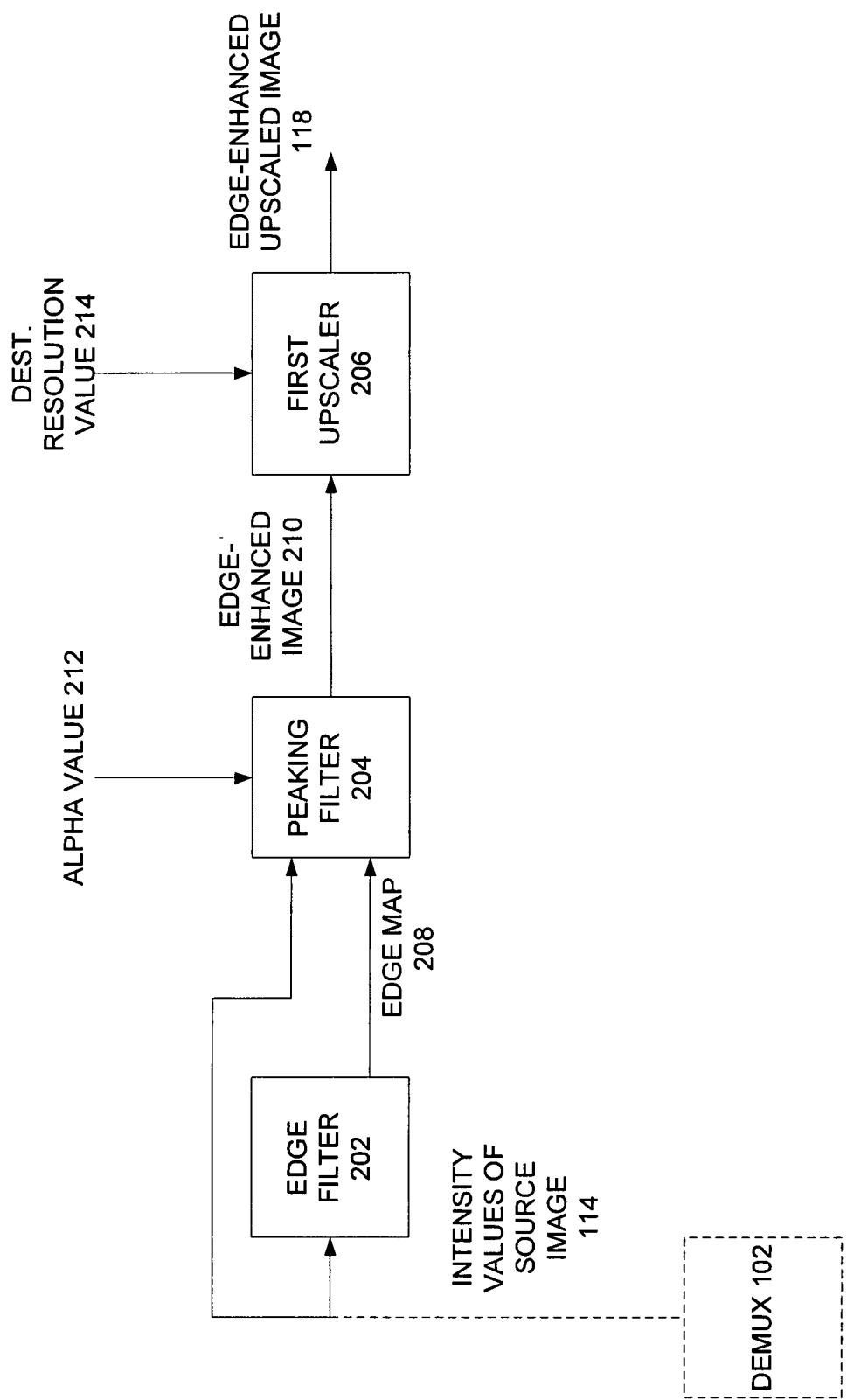
FIG. 2 illustrates a block diagram of the intensity processor of FIG. 1 in accordance with the prior art, wherein the intensity processor performs edge enhancement and upscaling.

FIG. 2 illustrates a block diagram of the intensity processor 106 of FIG. 1 in accordance with the prior art, wherein the intensity processor 106 performs edge enhancement and upscaling. Intensity processor 106 includes edge filter 202, peaking filter 204 and first upscaler 206, and may include, for example, demultiplexor 102, or any other suitable source of the intensity values of source image 114. Edge filter 202 receives the intensity values of source image 114 and generates therefrom an edge map 208, which represents whether an edge is present at each corresponding location in the source image. Edge filter 202 may use a Laplace filter, a sobel filter, a canny filter, or any other suitable edge detection filter. In one embodiment, edge filter 202 determines if there is an edge at a given location by taking the pixel location's eight neighboring pixels and performs spatial filtering against the following kernel (i.e., filter coefficients):

$$\begin{matrix} [-1 & -1 & -1] \\ [-1 & 8 & -1] \\ [-1 & -1 & -1]. \end{matrix}$$

Using this filter kernel, an edge is detected when the result of the matrix multiplication is non-zeros. It is recognized that the result of the filtering may be positive and/or negative. When performed repetitiously, an edge map 208 is constructed for each pixel in the source image 110.

Peaking filter 204 generates edge-enhanced image 210 (i.e., a sharpened image) based on the edge map 208, the intensity values of source image 114, and an alpha value 212. Alpha value 212 may be any suitable peaking factor for direct control of the edge enhancement. It is recognized that the alpha value 212 also has a direct correlation to the degree to which the sharpened image 210 contains halo effects. When alpha is set to zero there are no halo effects; conversely, when alpha is set to a higher value (e.g., 0.5), more "halo"-ing will be visible in the edge-enhanced image 210. It is recognized that the alpha value 212 is usually adjustable by the user of a system containing intensity processor 106 so that the sharpness of the destination image 120 is appealing. One having ordinary skill in the art will recognize that the alpha value 212 may be generated by and transmitted by any suitable logic (not specifically show) or any other suitable circuit element. It is further recognized that in one embodiment, alpha value 212 is fixed and the peaking filter 204 is hard programmed to perform a fixed peaking operation with a fixed alpha value 212. In one embodiment, peaking filter 204 performs the following linear matrix operations: A+(Edge map)*(alpha value) where A represents the intensity values of source image 114. It is recognized, however, than any other suitable peaking equation may be used to generate sharpened image 210.

First upscaler 206 generates the edge-enhanced upscaled image 118 based on the edge-enhanced image 210 and the destination resolution value 214. Destination resolution value 214 may be generated and transmitted by any suitable logic (not shown) and represents or is associated with the resolution of the edge-enhanced upscaled image 118 (which also happens to have the same resolution as the destination image 120). For example, destination resolution value 214 may be a ratio that relates the relative resolution of the destination image 120 with the source image 110. In another embodiment, first upscaler 206 may be hard programmed with the destination resolution value 214 to obviate the need for the transmission of the destination resolution value 214. First upscaler 206 generates the edge-enhanced upscaled image 118 based on interpolation using one of: a bilinear filtering scheme, a bicubic filtering scheme and edge-directional interpolation scheme. In general, the edge-enhanced upscaled image 118 is more appealing (i.e., it looks better) if first upscaler 206 is a good quality directional upscaler (e.g., a diamond upscaler) rather than a scaler implemented using bilinear filter schemes and bicubic filter schemes that generate jagged edges along diagonal contours. However, it is recognized that first upscaler 206 may generate the edge-enhanced upscaled image 118 using any suitable interpolation scheme. As is recognized "logic" may include any suitable combination of integrated circuit components (e.g., transistors) and may, in one embodiment correspond to memory or one or more processors capable of executing instructions store in memory to perform the tasks described herein.

Figure 3:
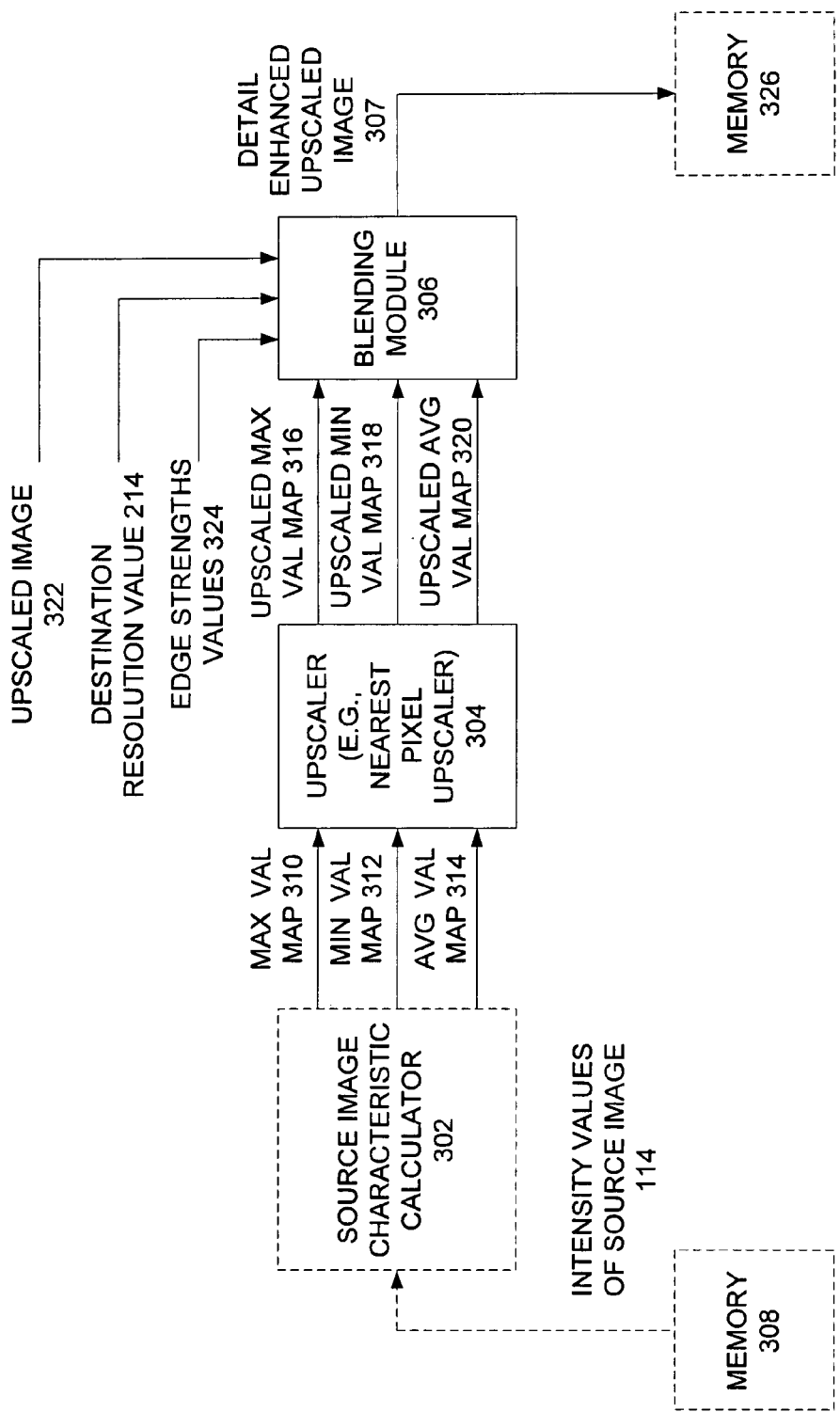
FIG. 3 illustrates a block diagram of a portion of a video processing unit or any other suitable integrated circuit having a source image characteristic calculator, an upscaler and blending module in accordance with one embodiment of the present disclosure.

FIG. 3 illustrates a block diagram of a portion of a video processing unit or any other suitable integrated circuit 300 having a source image characteristic calculator 302, second upscaler 304 and blending module 306 in accordance with one embodiment of the present disclosure. It is recognized that the portion of the video processing unit (or any other suitable integrated circuit) 300 may be a stand alone unit on its own integrated circuit or circuits or may be a portion of a larger processing devices such as, but not limited to, a graphics processing unit having video processing capabilities. The portion of the video processing unit (or any other suitable integrated circuit) 300 and its components may be implemented on any number of integrated circuits or integrated circuit packages and may be, for example, an application specific integrated circuit, a digital signal processor, a SIMD machine/processor, a processing core of a larger processor, or any other suitable device or element. In one embodiment, the portion of the video processing unit (or any other suitable integrated circuit) 300 and its components may be implemented using one or more processors coupled to memory containing executable instructions such that when the executable instructions, the one or more processors performs the tasks as described above. The portion of the video processing unit (or any other suitable integrated circuit) 300, in one embodiment, may be an intensity processor similar to intensity processor 106.

Source image characteristics calculator 302 is coupled to receive the intensity values 114 of source image from memory 308 or any other suitable source of video as described above. Source image characteristics calculator 302 generates a maximum ("max") value map, a minimum ("min") value map 312 and an average value map 314. The max value map 310 represents the largest (or any other suitably large) intensity value of the surrounding pixels in the source image. As used herein, "surrounding" pixels may include those pixels that directly abut against the pixel in issue or may include pixels that are separated by one or more other pixels. The min value map 312 represents the smallest (or any other suitably small) intensity value of the surrounding pixels in the source image. The average value map represents the average pixel values at corresponding locations in the max and min value maps. In one embodiment, the source image characteristics calculator 302 is located off the IC or IC's associated with upscaler 304 and blending module 306. In one embodiment, the maximum value map 310, the minimum value map 312 and the average value map 314 are provided from any suitable source.

Upscaler 304 upscales each of max value map 310, min value map 312, and average value map 314 to generate upscaled max value map 316, upscaled min value map 318 and upscaled average value map 320, respectively. In one embodiment, second scaler 304 is three separate upscalers. In another embodiment, second upscaler 304 implements a nearest pixel interpolation. Other interpolation schemes may also be used to generate the upscaled maps. In one embodiment, second upscaler 304 upscales each of its inputs by the destination resolution value 214 as described above with respect to first upscaler 206.

Blending module 306 generates detail-enhanced upscaled image 307 that is based on the source image and that has a resolution equal to or set at the destination resolution value 214. The detail-enhanced upscaled image 307 is generated by blending pixel values from an upscaled image 322 of the source image with at least one of the upscaled max value map and the upscaled min value map, and based on the edge strength values 324 in the source image and further based on a comparison of each pixel value in the upscaled image 322 with a corresponding pixel value in the average value map 314. Each of the upscaled image 322, the destination resolution value 214 and the edge strength values 324 may be generated by any suitable logic. As is recognized, each of the upscaled image 322 and the edge strength values 324 are based on the source image. At a minimum, upscaled image 322 is minimally an upscaled version of the source image. As is recognized, upscaled image 322 may also have other operations performed on it such that it is not merely the result of an upscale operation. While the destination resolution value 214 may be fixed or programmable, as explained above.

The blending performed by the blending module 306 to generate detail-enhanced upscaled image 307 is, in one embodiment, performed recursively for each pixel value such that a pixel value in one of the upscaled max value map 310 and the upscaled min map 312 contributes to a corresponding pixel value in the detail-enhanced upscaled image 307 when the pixel value difference of a corresponding pixel value in the upscaled image 322 and a corresponding pixel value in the average value map 314 is beyond a known threshold value. Finally, blending module 306 may optionally be coupled to memory 326 such as, but not limited to, a frame buffer. As is recognized the detail enhanced upscaled image 307 may be multiplexed with processed chroma values 116 as provided in FIG. 1, may be store in memory 326 for subsequent processing, or may be transmitted to a monitor for a display thereon.

Figure 4:
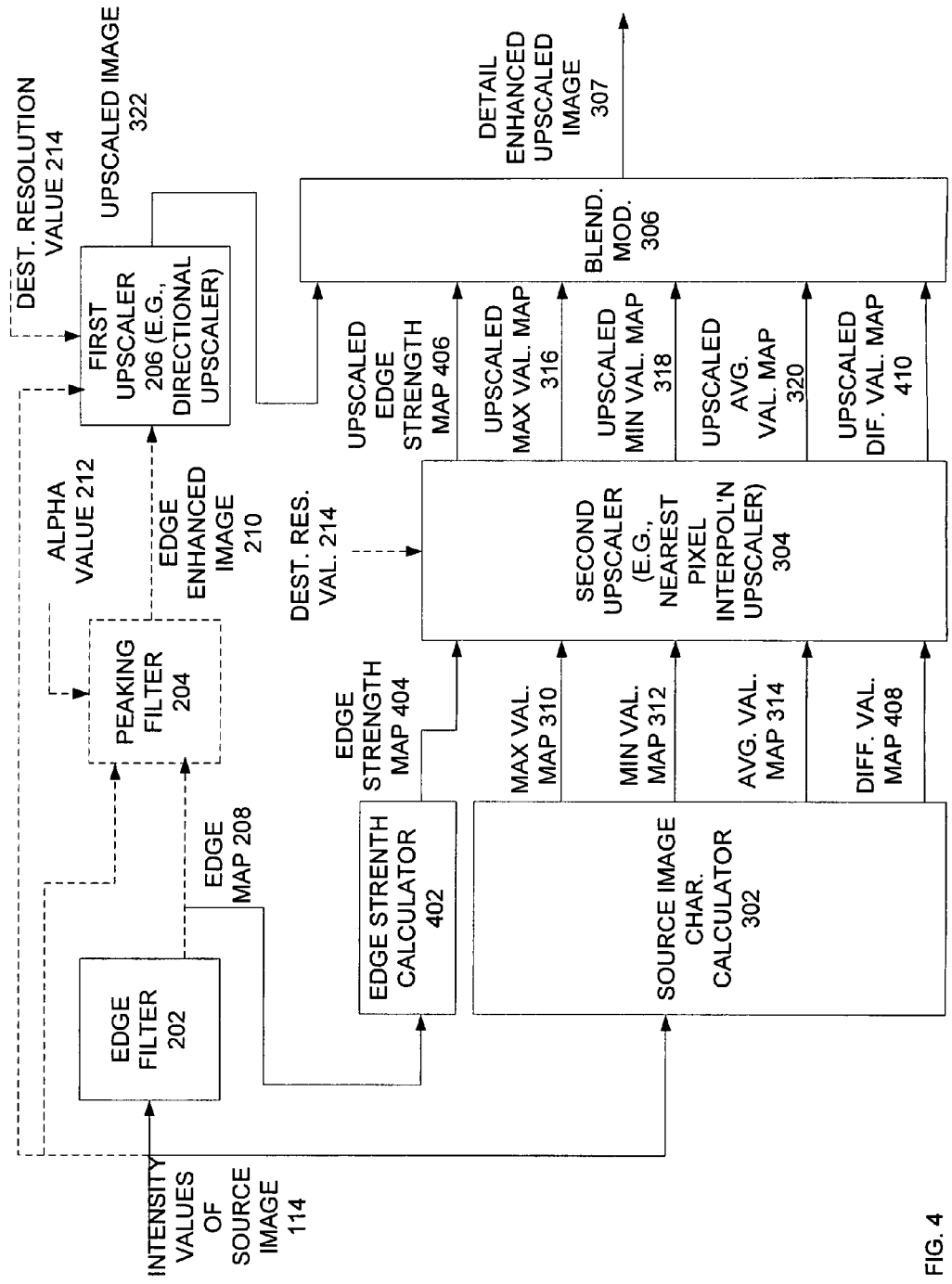
FIG. 4 illustrates a more detailed block diagram of the portion of the video processing unit of FIG. 3 in accordance with one embodiment of the present disclosure.

FIG. 4 illustrates a more detailed block diagram 400 of the portion of the video processing unit 300 of FIG. 3 in accordance with one embodiment of the present disclosure illustrating, in addition to the source image characteristics calculator 302, the second upscaler 304 and the blending module, the more detailed block diagram 400 further illustrates edge filter 202, peaking filter 204, first upscaler 206, and edge strength calculator 402. Each of the above components operates as described above with respect to FIGS. 1-3. In this case, upscaled image 322 is an edge-enhanced, upscaled image 118 if the peaking filter 204 is used in combination with the first upscaler 206. If peaking filter 204 is not used with the first upscaler 206, the upscaled image 322 is a non-edge-enhanced, upscaled image based on the source image.

Edge strength calculator 402 is coupled to edge filter 202 and generates an edge strength map 404 based on the edge map 208, where the edge strength map 404 represents, for each detected edge in the edge map 208, the strength of the edge. In one embodiment, edge strength values 324 of FIG. 3 are upscaled values of those values in the edge strength map 404. In one embodiment, edge strength calculator 402 takes each value in edge map 208 and, based on the surrounding values for each particular value in the edge map 208, the edge strength calculator 402 determines a maximum edge map value (emax) and a minimum edge map value (emin). In one embodiment, the edge strength for each map value or pixel is determined by the following equation:

$$\text{edge strength map value} = -\max(\min(emin,0),-t).*\max(\min(emax,t),0)/t/t/4;$$

Where the function max(a,b) gives a result equal to "a" when "a" is greater than "b" and vice versa, where the function min(a,b) gives a result equal to "a" when "a" is less than "b" and vice versa, and where "t" is a predetermined constant chosen by a circuit designer. In one embodiment, t=64.

Second scaler 304 receives the edge strength map 404 and generates the upscaled edge strength map 406 in the same manner that second scaler 304 generates upscaled max value map 316, upscaled min value map 318 and upscaled average value map 320. In one embodiment, edge strength values 324 of FIG. 3 are the values in the upscaled edge strength map 406.

Source image characteristic calculator 302 also generates the difference value map 408, which represents a relative difference between corresponding intensity values in the max value map 310 and the min value map 312. In one embodiment, each pixel value in the difference value map 408 is determined based on the following equation:

$$\text{difference extrema value map value} = (\text{value of corresponding intensity value in maximum value map } 310) - (\text{value of corresponding intensity value in minimum value map } 312)/r;$$

Where "r"=a predetermined constant chosen by a circuit designer. In one embodiment, r=32. In the manner described above, the second upscaler 304 upscales the difference value map 410. As described below, in one embodiment, each pixel value in the difference value map 410 is the threshold value for determining when the corresponding pixel location in one of the upscaled maximum value map 316 and the upscaled minimum value map 318 contributes to the corresponding pixel in the detail-enhanced image 307.

Blending module 306 generates detail-enhanced upscaled image 307. Detail-enhanced upscaled image 306 is a blended image of the following inputs: the upscaled image 322, the upscaled max value map 316 and the upscaled min value map 318. The amount of blending of each input for each pixel value (i.e., the blending is recursive) is controlled based on the relationship between the pixel values in the upscaled image 322, the upscaled edge strength map 406, the upscaled average value map 320 and the upscaled difference value map 410. In one embodiment, each pixel value of detail enhanced upscaled image 306 is determined based on the following equation:

Pixel value in image 306 =

((upscaled maximum value map 316.*BlendFactor1) +

(upscaled minimum value map 318.*BlendFactor2) + upscaled image 322.*(inverse of BlendFactor1).*

(inverse of BlendFactor2)).*

(upscaled edge strength map 406) +

(upscaled image 322.*(1-upscaled edge strength map)).

As used herein, the ".*" operator represents element by element multiplication (e.g., as that term is used in matrix algebra). Where BlendFactor1=1 if (upscaled image 118−upscaled average extrema value map 310)>upscaled difference extrema map 420; else=0, and where BlendFactor2=1 if (upscaled image 322−upscaled average extrema value map 320) <−(upscaled difference extrema map 410); else=0. As is recognized, the upscaled image 322 contributes to all pixel values in the detail-enhanced upscaled image 307. As is also recognized, the max and min value maps 310, 312 (i.e., the upscaled max and min value maps 316, 318) contribute to a corresponding pixel value in the detail-enhanced upscaled image 307 when the pixel value difference of a corresponding pixel value in the upscaled image 307 and a corresponding pixel value in the average value map 314 is beyond a known threshold value (e.g., based on the upscaled difference value map 410).

The result of blending module 306 (implementing the equation listed above) may be conceptually envisioned to be the result of a replacement step and a subsequent linear interpolation step. The replacement step substitutes max and min values from the upscaled max and min maps 316, 318 for pixel values in the upscaled image 307 where the pixel values in the upscaled image 322 are sufficiently different from the corresponding pixel value in the upscaled average value map 320. The result is then blended linearly with the upscaled image 322 using the upscaled edge strength value map 406 as a blending factor. The result of the use of max and min value is to reduce or eliminate the halo effect and to make the edge narrower. The result of the linear blend is to reduce artifacts in the texture areas of the image (e.g., in areas with small edge values) and to ensure that pixel values having edges with sufficient edge strength are given a pixel value similar to that found in the upscaled image 322.

Figure 5:
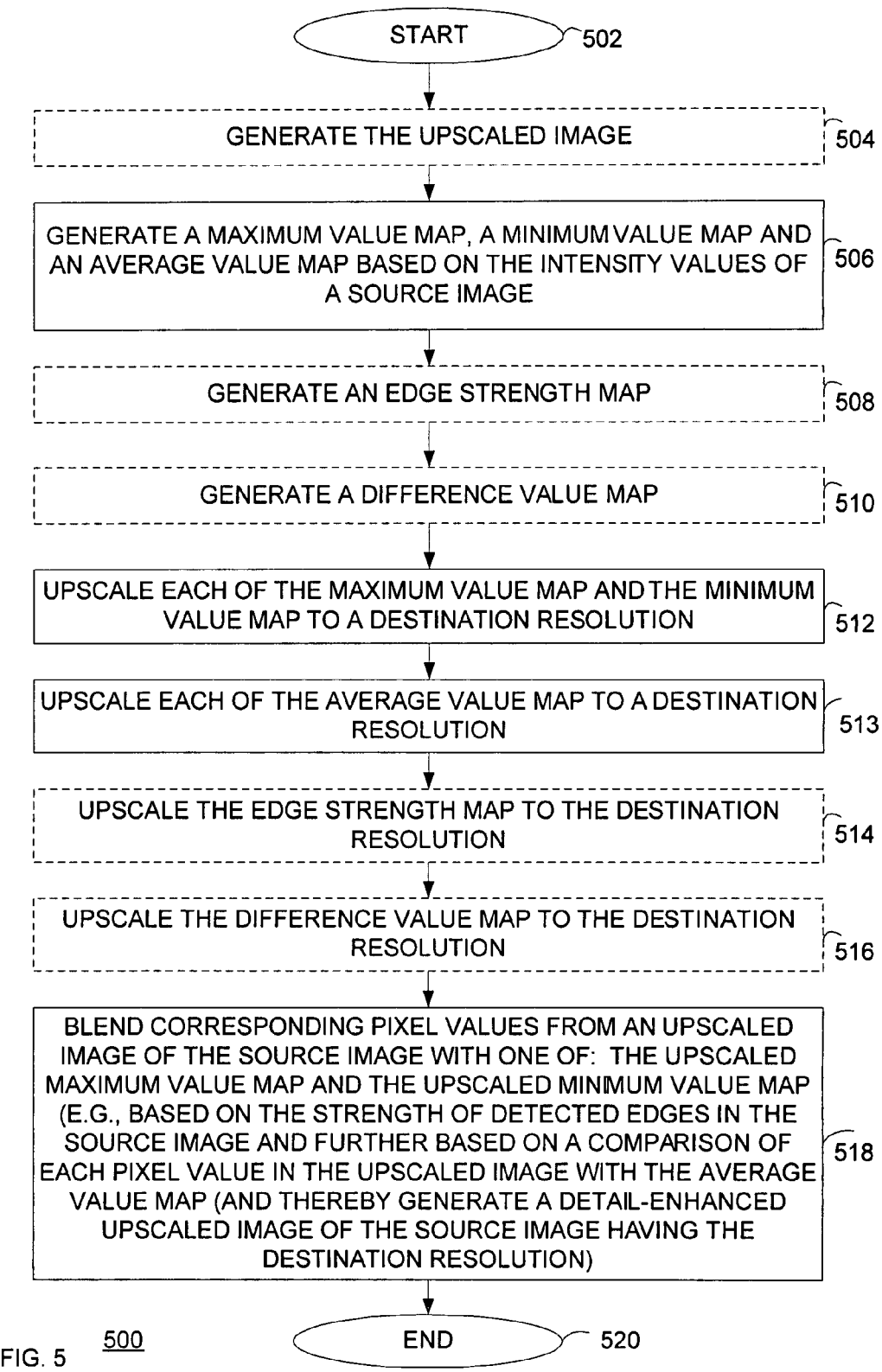
FIG. 5 illustrates an exemplary flow chart for generating a detail-enhanced upscaled image in accordance with one embodiment of the present disclosure.

FIG. 5 illustrates an exemplary flow chart 500 for generating a detail-enhanced upscaled image in accordance with one embodiment of the present disclosure. The method begins in block 502 wherein, for example, source image is received and demultiplexed so that that luminance values are separated from corresponding chroma values for each pixel in the source image. In another example of block 502, source video is received and demodulated so that source video is baseband video. The method continues in optional block 504 where an upscaled image is generated. In one embodiment, the upscaled image is an edge-enhanced upscaled image such as edge-enhanced upscaled image 118 as discussed above in FIGS. 2 and 4. In another embodiment, the upscaled image is an non-enhanced upscaled image from any suitable source.

The method continues in block 506 where a max value map, a min value map and an average value map are generated based on the intensity values of the source image. In one embodiment, the max value map, min value map and the average value map are max value map 310, min value map 312, and average value map 314 as provided above with respect to FIGS. 3 and 4. It is recognized, however, that each of the max value map, min value map and the average value map may be constructed using any methodology and using any suitable logic. The method continues with optional block 508 where an edge strength map is generated. In one embodiment, edge strength map may be edge strength map 404 as constructed by edge strength calculator 402. It is recognized that other suitable edge information constructed using alternate logic may also be used in place thereof. The method optionally includes block 510 where a difference value map is generated, e.g., difference value map 408 by source image characteristic calculator 302. It is recognized that other logic may be used to implement this information (or any other suitable threshold value information as described above). For example, source image threshold calculator 302 may be implemented using multiple logic blocks for each of its corresponding outputs.

The method includes block 512 where each of the max value map and the min value map are upscaled to the destination resolution. Block 513 includes upscaling the average value map to the destination resolution. In one embodiment, blocks 512 and 513 are achieved using second scaler 304. Optionally, the method includes blocks 514 and 516 where the edge strength map and difference value map are upscaled to the destination resolution. Like block 512, the upscaling of edge strength map and difference value map may be implemented using second scaler 304.

The method includes block 518 where a detail-enhanced upscaled image of the source image and having the destination resolution is generated by blending corresponding pixel values from an upscaled image of the source image with one of: the upscaled max value map ad the upscaled min value map. For example, the blending may be based on the strength of detected edges in the source image and further based on a comparison of each pixel value in the upscaled image with a corresponding pixel value in the average value map. In one embodiment, this is performed using blending module 306 as described above with reference to FIGS. 3-4. Finally, the method ends in block 520 where for example, the detail-enhanced upscaled image of the source image is stored in memory for subsequent processing (e.g., later multiplexing with processed chroma values 116) stored in memory (e.g., frame buffer) for display on a suitable display device or monitor, or directed to a suitable display directly. It is further recognized that memory may be located on a different system than the system in which the blending module resides. For example, memory may be located on a computing device on the Internet for receipt of the detail-enhanced upscaled image.

Figure 6:
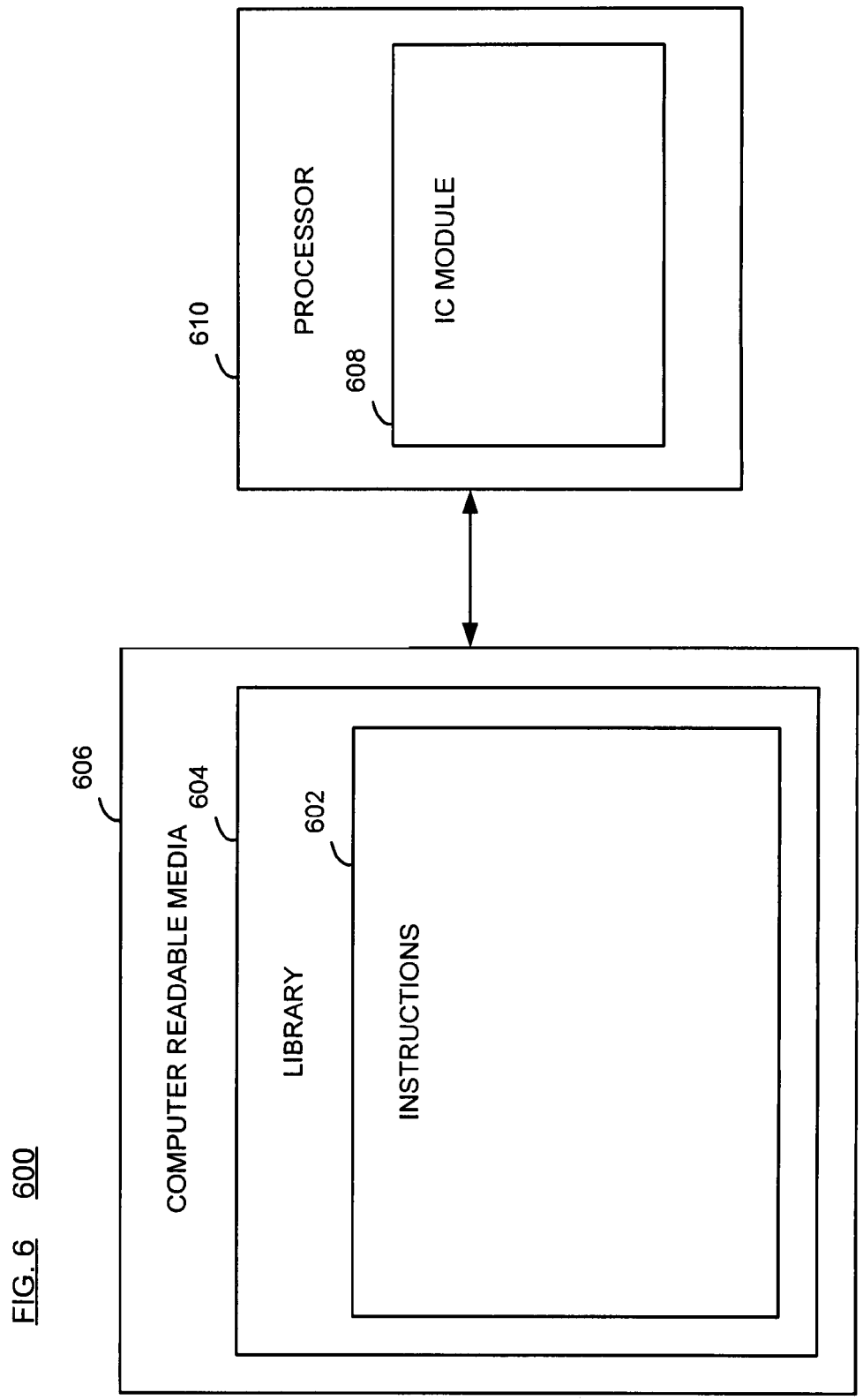
FIG. 6 illustrates a block diagram of an exemplary hardware design that may be used to implement one embodiment of the present disclosure.

FIG. 6 illustrates a block diagram 600 of an exemplary IC design system 600 that may be used to implement one embodiment of the present disclosure. More specifically, the processing described by the present disclosure may be embodied in a hardware-based implementation such as an integrated circuit. To this end, as known by those of skill in the art, a set of instructions 602 may be defined and stored within a library 604 that in turn is stored in a computer readable media 606. The instructions 602, which may include instructions represented in any suitable hardware design language (HDL) including, but not limited to, Verilog or another hardware representation such as GDSII, can be used by the IC module 608 that is executed by one or more processors 610 of the computing device design system 600. IC Module 608 is illustrated as being executed by the one or more processors 610. Thus IC module 608 may correspond to any suitable set of instructions corresponding to an integrated circuit design program stored in any suitable computer readable media such as memory (not specifically illustrated) or any other suitable hardwired portion of the one or more processors 610. Using instructions 602, the system 600 may be employed to create a suitable integrated circuit such as integrated circuit 300 of FIG. 3 or any portion thereof. In one embodiment, it is contemplated that an integrated circuit includes a field-programmable gate array. As further recognized, computer readable media 606 may be any suitable medium such as memory as defined above. Similarly, the one or more processors 610 may be any suitable processor as explained above with reference to video processing unit 100.

Accordingly, a system and method for upscaling while sharpening the details of an image has been disclosed. The detail-enhanced image limits the appearance of thick and blurred contours and edges in the destination image while also limiting halo effects. Additionally, it is recognized that the system and method described above is capable of being implemented in any combination of hardware and software. In one embodiment, the system and method is implemented in a programmable engine such as a programmable shader in a video processing unit or other video/graphics processing unit having one or more processing cores.

As is recognized detail-enhanced upscaled image 307 reduces halo effects in the destination image (i.e., when multiplexed with the corresponding processed chroma values 116). The same reduction in halo effects is noticeable in the upscaled image 307 itself. At the same time, the detail-enhanced upscaled image 307 gives the appearance of sharper edges and more detail.

It will also be recognized that the above description describes mere examples and that other embodiments are envisioned and covered by the appended claims. For example, memory 326 may also represent any suitable device or devices that is capable of receiving the detail-enhanced upscaled image. It is contemplated that blending module 306 may be coupled to a suitable transmitter for transmission of the detail-enhanced upscaled image 307 to another device such as a computing device coupled to the Internet so that the detail-enhanced upscaled image may be generated on the transmitting-side of such a transaction.

It is therefore contemplated that the present invention cover any and all modifications, variations or equivalents that fall within the spirit and scope of the basic underlying principles disclosed above and claimed herein.

What is claimed is:

1. An integrated circuit comprising:
a source image characteristic calculator operative to generate a maximum value map, a minimum value map, an average value map and a difference value map, wherein each pixel value in the average value map represents the average of corresponding pixel locations in the maximum and minimum value maps and wherein the difference value map represents a difference between corresponding values in the maximum and minimum value maps;
an upscaler operative to upscale each of the maximum value map, the minimum value map, the average value map and the difference value map to a destination resolution; and
a blending module operative to blend pixel values from an upscaled image of a source image with corresponding values of at least one of the upscaled maximum value map and the upscaled minimum value map based on a comparison of each pixel value in the upscaled image with a corresponding pixel value in the upscaled average value map, and wherein each pixel value in the upscaled difference value map provides a known threshold value for determining when the corresponding pixel location in one of the upscaled maximum value map and the upscaled minimum value map contributes to the corresponding pixel in a detail-enhanced upscaled image.

2. The integrated circuit of claim 1, wherein the source image characteristic calculator is operative to generate the maximum value map and the minimum value map based on the intensity values of a source image, wherein each pixel value in the maximum and minimum value maps represents the largest and smallest intensity value of pixels surrounding a corresponding pixel in the source image, respectively.

3. The integrated circuit of claim 1, wherein a pixel value in one of the upscaled maximum value map and the upscaled minimum value map contributes to a corresponding pixel value in the upscaled image when the pixel value difference of a corresponding pixel value in the upscaled image and a corresponding pixel value in the upscaled average value map is beyond the known threshold value.

4. The integrated circuit of claim 1, further comprising an edge strength calculator operative to generate an edge strength map representing the strength of each edge in the source image, wherein:
the upscaler is further operative to upscale the edge strength map to the destination resolution, and
the blending module is operative to blend further based on the upscaled edge strength map.

5. The integrated circuit of claim 1, wherein:
the upscaler operatively utilizes a nearest pixel interpolation scheme to upscale each of the maximum value map, the minimum value map and the average value map.

6. The integrated circuit of claim 1, further comprising another upscaler operative to generate the upscaled image based on the intensity values of the source image, wherein the another upscaler is operative to generate the upscaled image using one of: bilinear filtering, bicubic filtering, and edge-directional filtering, and wherein the upscaled image represents one of: an edge-enhanced upscaled image having a resolution commensurate with the destination resolution, and a non-edge-enhanced upscaled image having a resolution commensurate with the destination resolution.

7. The integrated circuit of claim 1, further comprising:
an edge filter operative to generate an edge map that represents whether an edge is present at each corresponding location in the source image;
a peaking filter operative to generate an edge-enhanced image based on the edge map and the intensity values of the source image; and
another upscaler operative to generate an edge-enhanced upscaled image based on the edge-enhanced image.

8. The integrated circuit of claim 1, further comprising memory, wherein:
the blending module, by blending pixel values from an upscaled image of a source image with corresponding values of at least one of: the upscaled maximum value map and the upscaled minimum value map, is operative to generate the detail-enhanced upscaled image, and
the memory is operatively capable of storing the detail-enhanced upscaled image.

9. A method for generating an upscaled image comprising:
generating a maximum value map, a minimum value map, an average value map and a difference value map, wherein each pixel value in the average value map represents the average of corresponding pixel locations in the maximum and minimum value maps and wherein the difference value map represents a difference between corresponding values in the maximum and minimum value maps;
upscaling the maximum value map, the minimum value map, the average value map and the difference value map to a destination resolution;
blending corresponding pixel values from an upscaled image of the source image with at least one of the upscaled maximum value map and the upscaled minimum value map based on a comparison of each pixel value in the upscaled image with an upscaled average value map, and wherein each pixel value in the upscaled difference value map provides a known threshold value for determining when the corresponding pixel location in one of the upscaled maximum value map and the upscaled minimum value map contributes to the corresponding pixel in a detail-enhanced upscaled image.

10. The method of claim 9, further comprising generating the maximum value map and the minimum value map based on the intensity values of a source image, wherein each pixel value in the maximum and minimum value maps represents the largest and smallest intensity value of pixels surrounding a corresponding pixel in the source image, respectively.

11. The method of claim 9, wherein a pixel value in one of the upscaled maximum value map and the upscaled minimum value map contributes to a corresponding pixel value in the detail-enhanced upscaled image when the pixel value difference of a corresponding pixel value in the upscaled image and a corresponding pixel value in the upscaled average value map is beyond the known threshold value.

12. The method of claim 9, further comprising:
generating an edge strength map, representing the strength of each edge in the source image;
upscaling the edge strength map to the destination resolution; and
further blending corresponding pixel values from an upscaled image of the source image with at least one of: the upscaled maximum value map and the upscaled minimum value map based on the upscaled edge strength map.

13. The method of claim 9, wherein upscaling each of the maximum value map, the minimum value map and the average value map to a destination resolution includes utilizing a nearest pixel interpolation scheme to upscale each of the maximum value map, the minimum value map and the average value map.

14. The method of claim 9, further comprising generating the upscaled image based on the intensity values of the source image, wherein generating the upscaled image based on the intensity values of the source image comprises using one of: bilinear filtering, bicubic filtering, and edge-directional filtering, and wherein the upscaled image represents one of: an edge-enhanced upscaled image having a resolution commensurate with the destination resolution, and a non-edge-enhanced upscaled image having a resolution commensurate with the destination resolution.

15. The method of claim 9, wherein:
by blending pixel values from an upscaled image of a source image with corresponding values of at least one of: the upscaled maximum value map and the upscaled minimum value map, the detail-enhanced upscaled image is generated,
the method further comprising at least one of:
storing the detail-enhanced upscaled image; and
displaying the detail-enhanced upscaled image on a monitor.

16. An integrated circuit comprising:
an edge filter operative to generate an edge map that represents whether an edge is present at each corresponding location in a source image;
a peaking filter operative to generate an edge-enhanced image based on the edge map and intensity values of the source image;
an upscaler operative to generate an edge-enhanced upscaled image based on the edge-enhanced image;
a source image characteristic calculator operative to generate a maximum value map, a minimum value map and an average value map based on the intensity values of the source image, wherein each pixel value in the maximum and minimum value maps represents the largest and smallest intensity value of pixels surrounding a corresponding pixel in the source image, respectively, and wherein each pixel value in the average value map represents the average of corresponding locations in the maximum and minimum value maps;

an edge strength calculator operative to generate, based on the edge map, an edge strength map representing the strength of each edge in the source image;

another upscaler operative to upscale each of the maximum value map, the minimum value map, the average value map and the edge strength map to a destination resolution;

a blending module operative to generate a detail-enhanced upscaled image of the source image having the destination resolution, by blending corresponding pixel values from an upscaled image of the source image with at least one of: the upscaled maximum value map and the upscaled minimum value map based on the upscaled edge strength and further based on a comparison of each pixel value in the upscaled image with the average value map;

the source image characteristic calculator is further operative to generate a difference value map that represents a difference between corresponding values in the maximum and minimum value maps, the upscaler is operative to upscale the difference value map to the destination resolution; and each pixel value in the difference value map is a corresponding known threshold value for determining when the corresponding pixel location in one of the upscaled maximum value map and the upscaled minimum value map contributes to the corresponding pixel in the detail-enhanced upscaled image.

17. The integrated circuit of claim 16, wherein a pixel value in one of the upscaled maximum value map and the upscaled minimum value map contributes to a corresponding pixel value in the detail-enhanced upscaled image when the pixel value difference of a corresponding pixel value in the upscaled image and a corresponding pixel value in the average value map is beyond the corresponding known threshold value.

18. Non-transitory computer readable media comprising instructions such that when executed by at least one processor, the instructions cause the at least one processor to:

generate a maximum value map, a minimum value map, an average value map and a difference value map, wherein each pixel value in the average value map represents the average of corresponding pixel locations in the maximum and minimum value maps and wherein the difference value map represents a difference between corresponding values in the maximum and minimum value maps;

upscale the maximum value map, the minimum value map, the average value map and the difference value map to a destination resolution;

blend corresponding pixel values from an upscaled image of a source image with at least one of the maximum value map and the upscale maximum value map based on a comparison of each pixel value in the upscaled image with a corresponding pixel value in an upscaled average value map, and wherein each pixel value in the upscaled difference value map provides a known threshold value for determining when the corresponding pixel location in one of the upscaled maximum value map and the upscaled minimum value map contributes to the corresponding pixel in a detail-enhanced upscaled image.

19. The computer readable media of claim 18, wherein the instructions comprise hardware description language instructions.

20. The integrated circuit of claim 1, wherein the blending module is further operative to blend pixel values from the upscaled image of the source image with corresponding values of at least one of the upscaled maximum value map and the upscaled minimum value map based on a strength of detected edges in the source image.

21. The method of claim 9, wherein blending corresponding pixel values from the upscaled image of the source image with at least one of the upscaled maximum value map and the upscaled minimum value map is further based on a strength of detected edges in the source image.

22. The computer readable media of claim 18, further comprising instructions such that when executed by at least one processor, the instructions cause the at least one processor to:

blend corresponding pixel values from the upscaled image of the source image with at least one of the maximum value map and the upscale maximum value map further based on a strength of detected edges in the source image.

* * * * *